United States Patent
Park et al.

(10) Patent No.: US 9,401,788 B2
(45) Date of Patent: Jul. 26, 2016

(54) REFERENCE SIGNAL GENERATION METHOD AND APPARATUS

(71) Applicant: Electronics and Telecommunications Research Institute, Daejeon (KR)

(72) Inventors: Ki-Hyuk Park, Daejeon (KR); Bon-Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 113 days.

(21) Appl. No.: 14/041,237

(22) Filed: Sep. 30, 2013

(65) Prior Publication Data

US 2014/0241188 A1    Aug. 28, 2014

(30) Foreign Application Priority Data

Feb. 27, 2013    (KR) .................. 10-2013-0021290

(51) Int. Cl.
*H04L 12/26* (2006.01)
*H04L 5/00* (2006.01)
*H04L 27/26* (2006.01)

(52) U.S. Cl.
CPC .......... *H04L 5/0048* (2013.01); *H04L 27/2613* (2013.01)

(58) Field of Classification Search
CPC ....................................................... H04L 12/26
USPC .......................................................... 370/252
See application file for complete search history.

(56) References Cited

U.S. PATENT DOCUMENTS

| | | | | |
|---|---|---|---|---|
| 6,324,225 B1* | 11/2001 | Brianti et al. | ................. | 375/341 |
| 2009/0135803 A1* | 5/2009 | Luo et al. | ...................... | 370/350 |
| 2009/0252260 A1 | 10/2009 | Noh et al. | | |
| 2011/0151910 A1* | 6/2011 | Kim et al. | ..................... | 455/509 |
| 2012/0307868 A1* | 12/2012 | Zhou et al. | .................... | 375/130 |

FOREIGN PATENT DOCUMENTS

| | | |
|---|---|---|
| KR | 1020090076742 A | 7/2009 |
| KR | 1020090112534 A | 10/2009 |
| KR | 1020100042657 A | 4/2010 |

* cited by examiner

*Primary Examiner* — Ian N Moore
*Assistant Examiner* — Mewale Ambaye
(74) *Attorney, Agent, or Firm* — William Park & Associates Ltd.

(57) ABSTRACT

The present invention relates to a reference signal generation method and apparatus. In the reference signal generation method, cyclic shift values of a reference signal for a channel, output in a single frame, are calculated for respective slots constituting the single frame. The calculated cyclic shift values are stored. Base signal sequence phases of the reference signal for the channel, output in the single frame, are calculated for respective slots. The calculated base signal sequence phases are stored. A total phase of the reference signal is calculated based on the cyclic shift values and the base signal sequence phases previously stored for respective slots. A reference signal sequence is generated based on the calculated total phase.

15 Claims, 4 Drawing Sheets

REFERENCE SIGNAL GENERATION METHOD AND APPARATUS

CROSS REFERENCE TO RELATED APPLICATION

This application claims the benefit of Korean Patent Application No. 10-2013-0021290, filed on Feb. 27, 2013, which is hereby incorporated by reference in its entirety into this application.

BACKGROUND OF THE INVENTION

1. Technical Field

The present invention relates generally to a reference signal generation method and apparatus and, more particularly, to a reference signal generation method and apparatus, which generate reference signals in a wireless communication environment.

2. Description of the Related Art

Wireless communication systems are widely used to provide various types of communication content, such as audio, video, packet data messaging, and broadcasts. Such systems may be multiple access systems capable of supporting communication with a plurality of terminals by sharing available system resources. Examples of the multiple access systems include Code Division Multiple Access (CDMA) systems, Time Division Multiple Access (TDMA) systems, Frequency Division Multiple Access (FDMA) systems, Orthogonal FDMA (OFDMA) systems, Single Carrier-FDMA (SC-FDMA) systems, etc.

Such wireless communication systems may include a predetermined number of nodes B capable of supporting communication with a predetermined number of pieces of User Equipment (UE). Each node B may support one or more cells and periodically transmit reference signals for the respective cells. Reference signals may be referred to as 'pilots.' Such reference signals from respective cells may be used for various purposes, such as channel estimation, signal strength measurement, and signal quality measurement.

Therefore, schemes for simplifying the processing of reference signals and providing good performance are required, and then methods of generating reference signals suitable for such schemes are required.

In relation to this, Korean Patent Application Publication No. 10-2010-0042657 discloses technology related to "Generation of reference signals in a wireless communication system."

SUMMARY OF THE INVENTION

Accordingly, the present invention has been made keeping in mind the above problems occurring in the prior art, and an object of the present invention is to provide a reference signal generation method and apparatus, which calculate the cyclic shift values and the phases of reference signals for respective channels that may appear in a single frame interval and store the calculated cyclic shift values and phases in memory, and which generate reference signal sequences based on the cyclic shift values and phases of the reference signals, stored in the memory and corresponding to respective slots, whenever a slot changes, thus reducing a calculation procedure required to generate reference signals.

In accordance with an aspect of the present invention to accomplish the above object, there is provided a reference signal generation method in a wireless communication environment, including calculating cyclic shift values of a reference signal for a channel, output in a single frame, for respective slots constituting the single frame; storing the calculated cyclic shift values; calculating base signal sequence phases of the reference signal for the channel, output in the single frame, for the respective slots; storing the calculated base signal sequence phases; calculating a total phase of the reference signal based on the cyclic shift values and the base signal sequence phases previously stored for the respective slots; and generating a reference signal sequence based on the calculated total phase.

Preferably, the channel output in the single frame may include one of a control channel (Physical Uplink Control Channel: PUCCH) allocated to a control area and a shared channel (Physical Uplink Shared Channel: PUSCH) allocated to a data area.

Preferably, the reference signal generation method may further include, before calculating the cyclic shift values of the reference signal for the channel for the respective slots, receiving a low-power mode instruction from a higher layer.

Preferably, calculating the cyclic shift values of the reference signal for the channel for the respective slots may include calculating cyclic shift values of the reference signal for a control channel for the respective slots; and calculating cyclic shift values of the reference signal for a shared channel for the respective slots.

Preferably, storing the cyclic shift values may include storing the calculated cyclic shift values for the control channel in a form of a table; and storing the calculated cyclic shift values of the shared channel in a form of a table.

Preferably, wherein calculating the base signal sequence phases of the reference signal for the channel for the respective slots may include calculating base signal sequence phases for a control channel for the respective slots; and calculating base signal sequence phases for a shared channel for the respective slots.

Preferably, storing the base signal sequence phases may include storing the calculated base sequence phases for the control channel in a form of a table; and storing the calculated base signal sequence phases for the shared channel in a form of a table.

Preferably, calculating the total phase of the reference signal may be configured to calculate the total phase of the reference signal based on the cyclic shift values and the base signal sequence phases stored in correspondence with respective slots and the channel whenever a slot changes.

In accordance with another aspect of the present invention to accomplish the above object, there is provided a reference signal generation apparatus in a wireless communication environment, including a cyclic shift value calculation unit for calculating cyclic shift values of a reference signal for a channel, output in a single frame, for respective slots constituting the single frame; a cyclic shift value storage unit for storing the calculated cyclic shift values; a signal sequence phase calculation unit for calculating base signal sequence phases of the reference signal for the channel, output in the single frame, for the respective slots; a signal sequence phase storage unit for storing the calculated base signal sequence phases; a total phase calculation unit for calculating a total phase of the reference signal based on the cyclic shift values and the base signal sequence phases previously stored for the respective slots; and a reference signal generation unit for generating a reference signal sequence based on the calculated total phase.

Preferably, the channel output in the single frame may include one of a control channel (Physical Uplink Control Channel: PUCCH) allocated to a control area and a shared channel (Physical Uplink Shared Channel: PUSCH) allocated to a data area.

Preferably, the cyclic shift value calculation unit may include a first calculation unit for calculating cyclic shift values of the reference signal for a control channel for the respective slots; and a second calculation unit for calculating cyclic shift values of the reference signal for a shared channel for the respective slots.

Preferably, the cyclic shift value storage unit may include a first storage unit for storing the calculated cyclic shift values for the control channel in a form of a table; and a second storage unit for storing the calculated cyclic shift values of the shared channel in a form of a table.

Preferably, the signal sequence phase calculation unit may include a third calculation unit for calculating base signal sequence phases for a control channel for the respective slots; and a fourth calculation unit for calculating base signal sequence phases for a shared channel for the respective slots.

Preferably, the signal sequence phase storage unit may include a third storage unit for storing the calculated base signal sequence phases for the control channel in a form of a table; and a fourth storage unit for storing the calculated base signal sequence phases for the shared channel in a form of a table.

Preferably, the total phase calculation unit may calculate the total phase of the reference signal based on the cyclic shift values and the base signal sequence phases stored in correspondence with respective slots and the channel whenever a slot changes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings so as to describe in detail the present invention to such an extent that those skilled in the art can easily implement the technical spirit of the present invention. Reference now should be made to the drawings, in which the same reference numerals are used throughout the different drawings to designate the same or similar components. In the following description, detailed descriptions of related known elements or functions that may unnecessarily make the gist of the present invention obscure will be omitted.

Below, a reference signal generation method and apparatus according to embodiments of the present invention will be described in detail with reference to the attached drawings.

In order to perform the demodulation of received signals and/or channel estimation in a wireless communication environment, the transmission of reference signals is required. For example, in the case of the 3rd Generation Partnership Project (3GPP) Long Term Evolution (LTE) system, reference signals include a demodulation reference signal which is required to demodulate a Physical Uplink Shared Channel (hereinafter referred to as a "PUSCH") and a Physical Uplink Control Channel (hereinafter referred to as a "PUCCH") used for uplink transmission, and a sounding reference signal which is not related to the PUSCH and PUCCH. For both reference signals, the same base sequence set may be used, and both reference signals are designated as a reference signal in the following description.

Such reference signals are used to estimate a fading channel encountered by transmission signals at a receiver. Further, reference signals are also used to measure the channel quality information of a current cell or another cell. The fields of application of reference signals are various in such a way that reference signals are used to obtain synchronization when a terminal operated in a time/frequency tracking mode or a sleep mode is enabled again. Such a reference signal uses sequences, and it is profitable to use a large number of sequences from the standpoint of cell scheduling. Each reference signal is also called a pilot.

Figure 1:
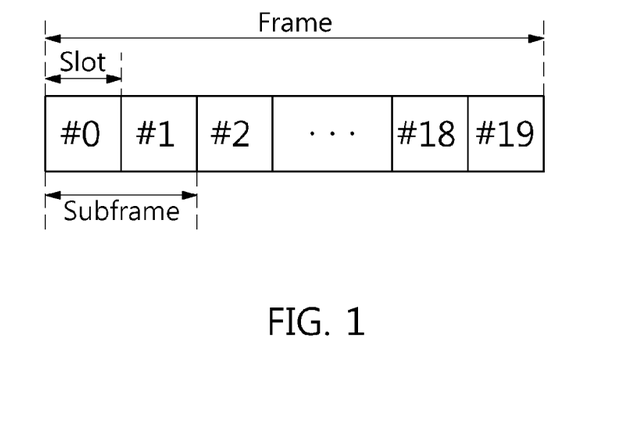
FIG. 1 is a diagram showing the structure of a frame according to the present invention.

FIG. 1 is a diagram showing the structure of a frame according to the present invention.

Referring to FIG. 1, a single frame in a wireless communication environment according to the present invention is composed of 10 subframes, and a single subframe includes two slots. The length of a single subframe may be 1 ms and the length of a single slot may be 0.5 ms.

Figure 2:
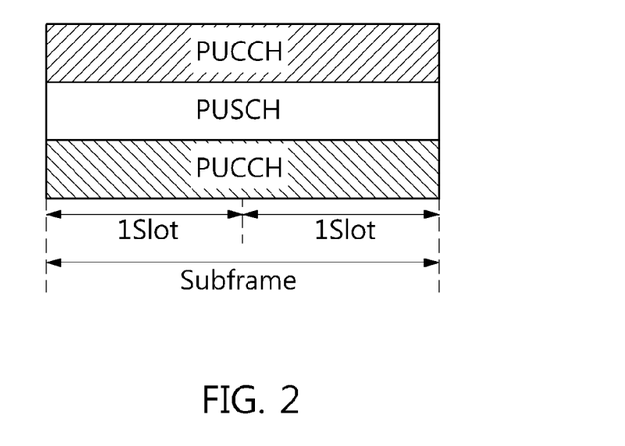
FIG. 2 is a diagram showing the structure of a subframe according to the present invention.

FIG. 2 is a diagram showing the structure of a subframe according to the present invention.

Referring to FIG. 2, a subframe according to the present invention may be divided into two parts, that is, a control area and a data area. A middle portion of the subframe is allocated to the data area and both sides of the data area are allocated to the control area. The control area is a area in which only a control signal is transmitted and to which a control channel is generally allocated. The data area is a area in which data is transmitted and to which a shared channel is generally allocated. The control channel allocated to the control area is referred to as a "PUCCH," and the shared channel allocated to the data area is referred to as a "PUSCH." A terminal transmits channel quality information to a base station through at least one of the PUCCH and the PUSCH. In this case, the terminal does not simultaneously transmit information through the PUCCH and the PUSCH.

As described above, the channels of an uplink physical layer in LTE standards used in the present invention include a PUSCH and a PUCCH, and include a reference signal for channel estimation.

A reference signal sequence $r_{u,v}^{(\alpha)}(n)$ in the present invention is defined by the following Equation (1) using the cyclic shift value $a(n_s)$ of a base signal sequence $\bar{r}_{u,v}(n)$:

$$r_{u,v}^{(\alpha)}(n) = e^{j\alpha n}\bar{r}_{u,v}(n), 0 \leq n < M_{SC}^{RS} \quad (1)$$

where $M_{RC}^{RS} = mN_{SC}^{RS}$ denotes the length of the reference signal sequence, and $N_{SC}^{RB}$ denotes the number of subcarriers per reference block. $n_s$ denotes a slot number. When $M_{SC}^{RS} \geq 3N_{SC}^{RB}$, a base signal sequence $\bar{r}_{u,v}(0), \ldots, \bar{r}_{u,v}(M_{SC}^{RS}-1)$ is given by the following Equation (2):

$$\bar{r}_{u,v}(n) = x_q(n \bmod N_{ZC}^{RS}), 0 \leq n < M_{sc}^{RS} \quad (2)$$

where a $q^{th}$ root Zadoff-Chu sequence is defined by the following Equation (3):

$$x_q(m) = e^{-j\frac{\pi q m(m+1)}{N_{ZC}^{RS}}}, 0 \leq m \leq N_{ZC}^{RS} - 1 \quad (3)$$

where q is given by the following Equation (4):

$$q = \lfloor \bar{q} + \frac{1}{2} \rfloor + v \cdot (-1)^{\lfloor 2\bar{q} \rfloor}$$

$$\bar{q} = N_{SC}^{RS} \cdot (\alpha+1)/31 \quad (4)$$

A sequence group number u in slot $n_s$ is calculated by the following Equation (5) using a group hopping pattern $f_{gh}(n_s)$ and a sequence-shift pattern $f_{ss}$:

$$u = (f_{gh}(n_s) + f_{ss}) \bmod 30 \quad (5)$$

Sequence group hopping may be enabled or disabled in response to a higher layer parameter Sequence-hopping-enabled. The PUCCH and the PUSCH have the same hopping pattern, but have different sequence shift patterns.

The group hopping pattern $f_{gh}(n_s)$ is identical for the PUCCH and the PUSCH, and is calculated by the following Equation (6):

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad (6)$$

In this case, a pseudo random code sequence c(n) having a length of $M_{PN}$ (where $n=0, 1, \ldots, M_{PN}-1$) is implemented using a Gold sequence having a length of 31 by the following Equation (7):

$$c(n) = (x_1(n+N_c) + x_2(n+N_c)) \bmod 2$$

$$x_1(n+31) = (x_1(n+3) + x_1(n)) \bmod 2 \quad (7)$$

$$x_2(n+31) = (x_2(n+3) + x_2(n+2) + x_2(n+1) + x_2(n)) \bmod 2$$

In this case, $N_c = 1600$, and a first m-sequence is initialized with $x_1(0)=1$, $x_1(n)=0$ ($n=1, 2, \ldots, 30$). A second m-sequence is initialized with $$c_{init} = \left\lfloor \frac{N_{ID}^{cell}}{30} \right\rfloor$$

at the start position of every radio frame.

A sequence shift pattern $f_{ss}^{PUCCH}$ in the PUCCH channel is given by the following Equation (8):

$$f_{ss}^{PUCCH} = N_{ID}^{cell} \bmod 30 \quad (8)$$

A sequence shift pattern $f_{ss}^{PUSCH}$ in the PUSCH channel is given by the following Equation (9):

$$f_{ss}^{PUSCH} = (f_{ss}^{PUCCH} + \Delta_{ss}) \bmod 30,$$
$$\text{where } \Delta_{ss} \in \{0, 1, \ldots, 29\} \quad (9)$$

where $\Delta_{ss}$ denotes parameter deltas transferred from a higher layer.

Sequence hopping is applied only to a reference signal having a length of $M_{sc}^{RS} \geq 6N_{sc}^{RB}$.

The base sequence number v of a reference signal having a length of $M_{ss}^{RS} < 6N_{sc}^{PB}$ is v=0.

The base sequence number V of the reference signal having a length of $M_{sc}^{RS} \geq 6N_{sc}^{PB}$ is calculated in slot $n_s$ by the following Equation (10):

$$v = \begin{cases} c(n_s) & \text{if group hopping is disabled and} \\ & \text{sequence hopping is enabled} \\ 0 & \text{otherwise} \end{cases} \quad (10)$$

In this case, the pseudo random code sequence c(i) is initialized with $$c_{init} = \left\lfloor \frac{N_{ID}^{cell}}{30} \right\rfloor \cdot 2^5 + f_{ss}^{PUSCH}$$

when each radio frame starts.

The pseudo random code sequence may be enabled or disabled in response to the parameter Sequence-hopping-enabled provided by the higher layer.

In this case, the phase $\phi(n_s, m)$ of the base signal sequence $\bar{r}_{u,v}(n)$ is given by the following Equation (11):

$$\phi(n_s, m) = \frac{\pi q m(m+1)}{N_{ZC}^{RS}}, 0 \leq m \leq N_{ZC}^{RS} - 1 \quad (11)$$

The cyclic shift value $\alpha(n_s)$ and the phase $\phi(n_s, m)$ of the base signal sequence $\bar{r}_{u,v}(n)$ calculated in this manner are given differently for respective channels.

The cyclic shift value $\alpha$ of the demodulation reference signal (DM RS) of the PUSCH channel is given in slot $n_s$ by the following Equation (12):

$$\alpha = \frac{2\pi n_{cs}}{12} \quad (12)$$

$$n_{cs} = (n_{DMRS}^{(1)} + n_{DMRS}^{(2)} + n_{PRS}(n_s)) \bmod 12$$

where the value of $n_{DMRS}^{(1)}$ is given as a parameter Cyclic-shift provided by the higher layer and the value of $n_{DMRS}^{(2)}$ is determined by the field value of the cyclic shift in the most recent Downlink Control Information (DCI) format 0.

$n_{PRS}(n_s)$ is calculated by the following Equation (13):

$$n_{PRS}(n_s) = \sum_{i=0}^{7} c(8N_{symb}^{UL} \cdot n_s + i) \cdot 2^i \quad (13)$$

In this case, the pseudo random code sequence c(i) is initialized with $$c_{init} = \left\lfloor \frac{N_{ID}^{cell}}{30} \right\rfloor \cdot 2^5 + f_{ss}^{PUSCH}$$

at the beginning of each frame.

The length of the DM RS $r_{u,v}^{(\alpha)}(n)$ for PUCCH is given as $M_{sc}^{RS}=12$, and the cyclic shift value is given as follows. In the case of PUCCH formats (1/1a/1b), $\alpha(n_s, 1)$ is calculated by the following Equation (14):

$$\alpha(n_s, 1) = 2\pi \cdot \bar{n}_{cs}(n_s, 1)/N_{sc}^{RB} \qquad (14)$$

where $$\bar{n}_\alpha(n_s) = \lfloor n'(n_s) \cdot \Delta_{shift}^{PUSCH} / N' \rfloor \text{ and}$$

$\bar{n}_{cs}(n_s, l) =$ $$\begin{cases} \left[ \begin{array}{c} n_{cs}^{cell}(n_s, l) + \\ \left( \begin{array}{c} n'(n_s) \cdot \Delta_{shift}^{PUCCH} + \\ (\bar{n}_\alpha(n_s) \bmod \Delta_{shift}^{PUCCH}) \end{array} \right) \bmod N' \end{array} \right] \bmod N_{sc}^{RB} & \text{for normal cyclic prefix} \\ \left[ \begin{array}{c} n_{cs}^{cell}(n_s, 1) + \\ \left( \begin{array}{c} n'(n_s) \cdot \Delta_{shift}^{PUCCH} + \\ \bar{n}_\alpha(n_s) \end{array} \right) \bmod N' \end{array} \right] \bmod N_{sc}^{RB} & \text{for extended cyclic prefix} \end{cases}$$

In this case, n'($n_s$), N', $\Delta_{shift}^{PUCCH}$, and $n_{cs}^{cell}(n_s, 1)$ required to calculate $\bar{N}_{cs}(n_s, 1)$ are calculated by the following Equations:

$$n_{cs}^{cell}(n_s,1) = \Sigma_{i=0}^{7} c(8N_{symb}^{UL} \cdot n_s + 8l + i) \cdot 2^i \qquad (15)$$

In this case, the pseudo random code sequence c(i) is initialized with $c_{init} = N_{ID}^{cell}$ at the beginning of each frame. Here, l denotes a symbol number, and $n_s$ denotes a slot number.

$$N' = \begin{cases} N_{cs}^{(1)} & \text{if } n_{PUCCH}^{(1)} < C \cdot N_{cs}^{(1)}/\Delta_{shift}^{PUCCH} \\ N_{sc}^{RB} & \text{otherwise} \end{cases} \qquad (16)$$

$$c = \begin{cases} 3 & \text{normal cyclic prefix} \\ 2 & \text{extended cyclic prefix} \end{cases}$$

When $n_s \bmod 2 = 0$, $$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ ((n_{PUCCH}^{(1)} - c \cdot N_{cs}^{(1)}/\Delta_{shift}^{PUCCH}) \bmod & \\ ((c \cdot N_{sc}^{RB}/\Delta_{shift}^{PUCCH}) & \text{otherwise} \end{cases}$$

When $n_s \bmod 2 = 1$, $$n'(n_s) = \begin{cases} [c(n'(n_s - 1) + 1)] \bmod & \text{if } n_{PUCCH}^{(1)} \geq c \cdot \\ (cN_{sc}^{RB}/\Delta_{shift}^{PUCCH} + 1) - 1 & N_{cs}^{(1)}/\Delta_{shift}^{PUCCH} \\ \lfloor h/c \rfloor + (h \bmod c)N'/\Delta_{shift}^{PUCCH} & \text{otherwise} \end{cases}$$

In this case, h=(n'($n_s$-1)+d) mod (cN'/$\Delta_{shift}^{PUCCH}$) is satisfied (where d=2 for normal cyclic prefix (CP) and d=0 for extended CP). The parameter delta-PUCCH-Shift $\Delta_{shift}^{PUCCH}$ is provided by the higher layer.

Figure 3:
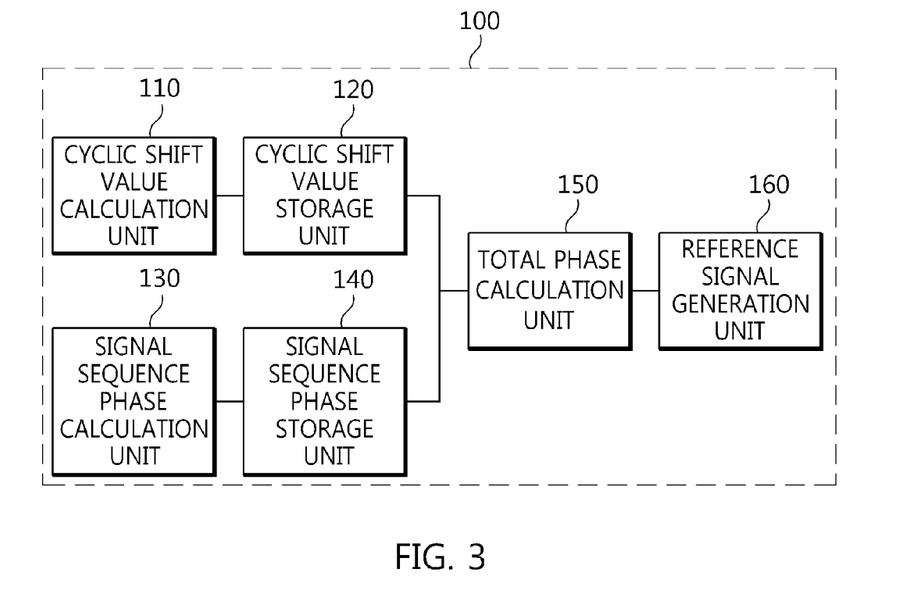
FIG. 3 is a diagram showing the schematic configuration of a reference signal generation apparatus according to an embodiment of the present invention.
Figure 4:
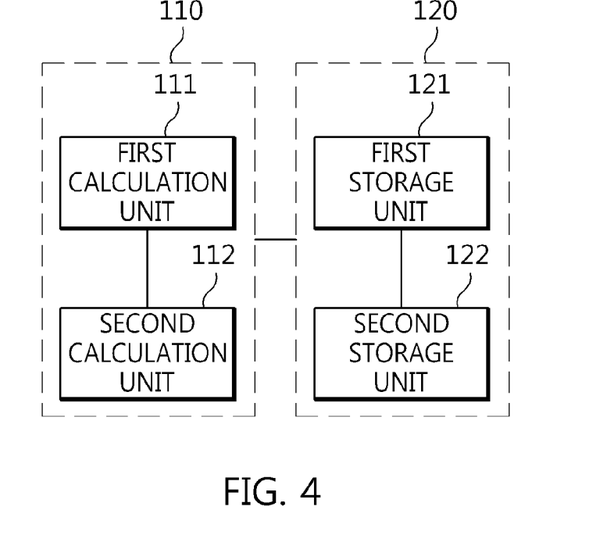
FIG. 4 is a diagram showing the detailed configurations of a cyclic shift value calculation unit and a cyclic shift value storage unit employed in the reference signal generation apparatus according to an embodiment of the present invention.
Figure 5:
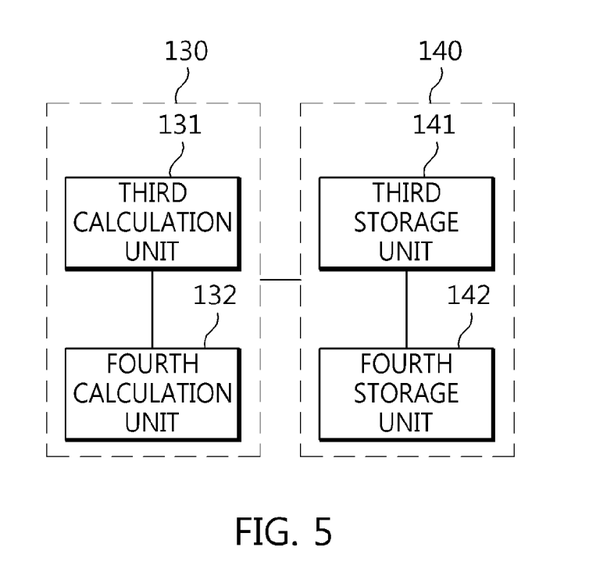
FIG. 5 is a diagram showing the detailed configurations of a signal sequence phase calculation unit and a signal sequence phase storage unit employed in the reference signal generation apparatus according to an embodiment of the present invention.

FIG. 3 is a diagram showing the configuration of a reference signal generation apparatus according to an embodiment of the present invention, FIG. 4 is a diagram showing the detailed configurations of a cyclic shift value calculation unit and a cyclic shift value storage unit employed in the reference signal generation apparatus according to an embodiment of the present invention, and FIG. 5 is a diagram showing the detailed configurations of a signal sequence phase calculation unit and a signal sequence phase storage unit employed in the reference signal generation apparatus according to an embodiment of the present invention.

Referring to FIG. 3, a reference signal generation apparatus 100 according to the present invention chiefly includes a cyclic shift value calculation unit 110, a cyclic shift value storage unit 120, a signal sequence phase calculation unit 130, a signal sequence phase storage unit 140, a total phase calculation unit 150, and a reference signal generation unit 160.

The cyclic shift value calculation unit 110 calculates cyclic shift values of a reference signal for a channel, output in a single frame, for respective slots. For example, in the case of LTE, a single frame is composed of 20 slots, and then 20 cyclic shift values are respectively calculated. Since a channel output in the single frame includes any one of a control channel PUCCH allocated to a control area and a shared channel PUSCH allocated to a data area, the cyclic shift value calculation unit 110 calculates 20 cyclic shift values for the control channel PUCCH if the channel corresponds to the control channel, and calculates 20 cyclic shift values for the shared channel PUSCH if the channel corresponds to the shared channel.

For this, as shown in FIG. 4, the cyclic shift value calculation unit 110 includes a first calculation unit 111 for calculating the cyclic shift values of the reference signal for the control channel for the respective slots, and a second calculation unit 112 for calculating the cyclic shift values of the reference signal for the shared channel for the respective slots.

The cyclic shift value storage unit 120 stores the calculated cyclic shift values. For this, as shown in FIG. 4, the cyclic shift value storage unit 120 includes a first storage unit 121 for storing the calculated cyclic shift values for the control channel in the form of a table, and a second storage unit 122 for storing the calculated cyclic shift values for the shared channel in the form of a table.

The signal sequence phase calculation unit 130 calculates the base signal sequence phases of a reference signal for a channel, output in a single frame, for the respective slots. Similarly to the cyclic shift value calculation unit 110, the signal sequence phase calculation unit 130 individually calculates 20 base signal sequence phases for the control channel if the channel corresponds to the control channel, and individually calculates 20 base signal sequence phases for the shared channel if the channel corresponds to the shared channel. For this, as shown in FIG. 5, the signal sequence phase calculation unit 130 includes a third calculation unit 131 for calculating the base signal sequence phases of the reference signal for the control channel for the respective slots, and a fourth calculation unit 132 for calculating the base signal sequence phases of the reference signal for the shared channel for the respective slots.

The signal sequence phase storage unit 140 stores the calculated base signal sequence phases. For this, as shown in FIG. 5, the signal sequence phase storage unit 140 includes a third storage unit 141 for storing the calculated base signal sequence phases for the control channel in the form of a table and a fourth storage unit 142 for storing the calculated base signal sequence phases for the shared channel in the form of a table.

The total phase calculation unit 150 calculates the total phase of the reference signal based on the cyclic shift values and the base signal sequence phases which are previously stored for the respective slots. The total phase calculation unit 150 calculates the total phase of the reference signal based on the cyclic shift values and the base signal sequence phases previously stored in correspondence with the respective slots and the channel output in the corresponding frame whenever a slot changes.

The reference signal generation unit 160 generates a reference signal sequence based on the calculated total phase. The reference signal generation unit 160 generates a final reference signal sequence by calculating cosine and sine values for the calculated total phase.

Figure 6:
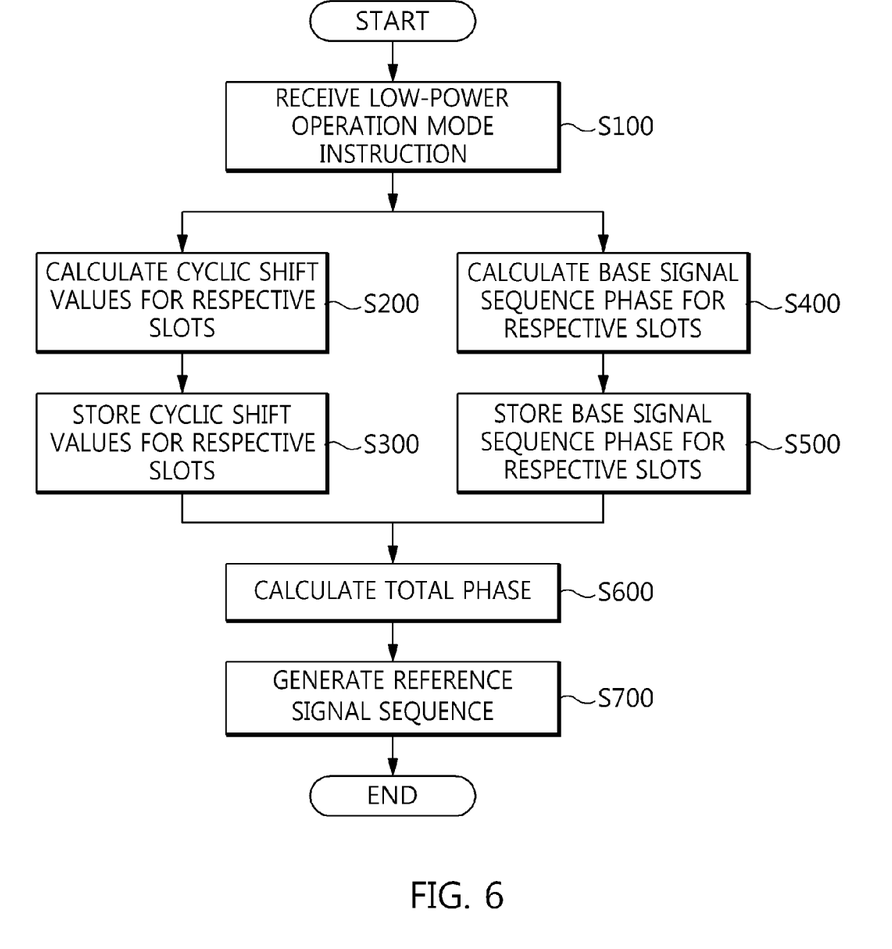
FIG. 6 is a flowchart showing a reference signal generation method according to an embodiment of the present invention.

FIG. 6 is a flowchart showing a reference signal generation method according to an embodiment of the present invention.

Referring to FIG. 6, a reference signal generation method according to the present invention relates to a method of generating reference signals using the above-described reference signal generation apparatus 100, and a repeated description thereof will be omitted here.

First, a low-power mode instruction is received from a higher layer at step S100.

Next, the cyclic shift values of a reference signal for a channel output in a single frame are calculated for the respective slots constituting the single frame at step S200.

In this case, since the channel output in the single frame includes any one of a control channel allocated to a control area and a shared channel allocated to a data area, cyclic shift values for the control channel are calculated for the respective slots if the channel corresponds to the control channel, and cyclic shift values for the shared channel are calculated for the respective slots if the channel corresponds to the shared channel.

Next, the calculated cyclic shift values are stored at step S300. In this case, the cyclic shift values for the control channel and the cyclic shift values for the shared channel are separately stored.

Then, the base signal sequence phases of the reference signal for the channel, output in the single frame, are calculated for the respective slots at step S400. At this step, similarly to step S200, the base signal sequence phases for the control channel are calculated for the respective slots, and the base signal sequence phases for the shared channel are calculated for the respective slots.

Next, the calculated base signal sequence phases are stored at step S500. In this case, the base signal sequence phases for the control channel and the base signal sequence phases for the shared channel are separately stored.

Then, the total phase of the reference signal is calculated based on the cyclic shift values and the base signal sequence phases which are previously stored for the respective slots at step S600. That is, the total phase of the reference signal is calculated based on the cyclic shift values and the base signal sequence phases previously stored in correspondence with respective slots and the channel output in the corresponding frame whenever a slot changes.

Next, a reference signal sequence is generated based on the calculated total phase at step S700.

As described above, the present invention calculates cyclic shift values and base signal sequence phases of a reference signal for each channel that may appear in a single frame interval, and previously stores the cyclic shift values and the base signal sequence phases in storage units, and generates a reference signal sequence based on the cyclic shift values and base signal sequence phases of a reference signal, stored in the storage units and corresponding to the respective slots, whenever a slot changes, thus supporting the low-power operations of wireless communication, such as for a terminal or a base station, by reducing power consumed in generating reference signals.

In accordance with the reference signal generation method and apparatus having the above configuration according to the present invention, there is an advantage in that the cyclic shift values and phases of a reference signal are calculated for each channel that may appear in a single frame interval, the cyclic shift values and the phases are previously stored in memory, and in that a reference signal sequence is generated based on the cyclic shift values and the phases of a reference signal, stored in the memory and corresponding to the respective slots, whenever a slot changes, thus reducing power consumed in generating reference signals.

Therefore, the present invention is advantageous in that the low-power operations of wireless communication, such as for a terminal or a base station, may be supported.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reference signal generation method in a wireless communication device, comprising:
    calculating cyclic shift values of a reference signal for a channel, output in a single frame with at least one of a control channel (PUCCH) and a data channel (PUSCH), for respective slots constituting the single frame;
    storing the calculated cyclic shift values in a memory;
    calculating base signal sequence phases of the reference signal for the channel, output in the single frame, for the respective slots;
    storing the calculated base signal sequence phases in said memory;
    calculating a total phase of the reference signal based on the cyclic shift values and the base signal sequence phases previously stored for the respective slots; and
    generating a reference signal sequence based on the calculated total phase and transmit the generated reference signal to another wireless communication device over a wireless network, wherein storing the calculated cyclic shift values and the calculated base signal sequence phases for the receptive slots reduce power consumption when generating the reference signal.

2. The reference signal generation method of claim 1, wherein the channel output in the single frame comprises one of a control channel allocated to a control area and a shared channel allocated to a data area.

3. The reference signal generation method of claim 1, further comprising, before calculating the cyclic shift values of the reference signal for the channel for the respective slots, receiving a low-power mode instruction from a higher layer.

4. The reference signal generation method of claim 1, wherein calculating the cyclic shift values of the reference signal for the channel for the respective slots comprises:
    calculating cyclic shift values of the reference signal for a control channel for the respective slots; and
    calculating cyclic shift values of the reference signal for a shared channel for the respective slots.

5. The reference signal generation method of claim 4, wherein storing the cyclic shift values comprises:
    storing the calculated cyclic shift values for the control channel in a form of a table; and
    storing the calculated cyclic shift values of the shared channel in a form of a table.

6. The reference signal generation method of claim 1, wherein calculating the base signal sequence phases of the reference signal for the channel for the respective slots comprises:
    calculating base signal sequence phases for a control channel for the respective slots; and
    calculating base signal sequence phases for a shared channel for the respective slots.

7. The reference signal generation method of claim 6, wherein storing the base signal sequence phases comprises:
   storing the calculated base signal sequence phases for the control channel in a form of a table; and
   storing the calculated base signal sequence phases for the shared channel in a form of a table.

8. The reference signal generation method of claim 1, wherein calculating the total phase of the reference signal is configured to calculate the total phase of the reference signal based on the cyclic shift values and the base signal sequence phases stored in correspondence with respective slots and the channel whenever a slot changes.

9. A reference signal generation apparatus in a wireless communication device, comprising:
   at least one processor:
   cyclic shift value calculator that calculates cyclic shift values of a reference signal for a channel, output in a single frame with at least one of a control channel (PUCCH) and a data channel (PUSCH), for respective slots constituting the single frame;
   cyclic shift value storage media that stores the calculated cyclic shift values;
   a signal sequence phase calculator that calculates base signal sequence phases of the reference signal for the channel, output in the single frame, for the respective slots;
   signal sequence phase storage media that stores the calculated base signal sequence phases;
   total phase calculation calculator program code that calculates a total phase of the reference signal based on the cyclic shift values and the base signal sequence phases previously stored for the respective slots, and
   reference signal generator program code that generates a reference signal sequence based on the calculated total phase;
   cyclic shift value memory; and
   signal sequence phase memory;
   a reference signal generation unit transmit the generated reference signal to another wireless communication device over a wireless network,
   wherein storing the calculated cyclic shift values and the calculated base signal sequence phase for the receptive slots reduce power consumption when generating the reference signal.

10. The reference signal generation apparatus of claim 9, wherein the channel output in the single frame comprises one of a control channel allocated to a control area and a shared channel allocated to a data area.

11. The reference signal generation apparatus of claim 9, wherein the cyclic shift value calculation program code comprises:
   first calculator program code that calculates cyclic shift values of the reference signal for a control channel for the respective slots; and
   second calculator program code that calculates cyclic shift values of the reference signal for a shared channel for the respective slots.

12. The reference signal generation apparatus of claim 11, wherein the cyclic shift value storage memory comprises:
   first storage memory that stores calculated cyclic shift values for the control channel in a form of a table; and
   second storage memory that stores calculated cyclic shift values of the shared channel in a form of a table.

13. The reference signal generation apparatus of claim 9, wherein the signal sequence phase calculation program code comprises:
   third calculator program code that calculates base signal sequence phases for a control channel for the respective slots; and
   fourth calculator program code that calculates base signal sequence phases for a shared channel for the respective slots.

14. The reference signal generation apparatus of claim 9, wherein the signal sequence phase storage memory comprises:
   third storage memory that stores calculated base signal sequence phases for the control channel in a form of a table; and
   fourth storage memory that stores calculated base signal sequence phases for the shared channel in a form of a table.

15. The reference signal generation apparatus of claim 9, wherein the total phase calculator calculates the total phase of the reference signal based on the cyclic shift values and the base signal sequence phases stored in correspondence with respective slots and the channel whenever a slot changes.

* * * * *